Dec. 3, 1963

M. MORET 3,113,226

OSCILLATING DRIVE HAND MOTOR

Filed Nov. 28, 1961

INVENTOR
Michel Moret
BY
ATTORNEYS

Dec. 3, 1963    M. MORET    3,113,226
OSCILLATING DRIVE HAND MOTOR
Filed Nov. 28, 1961    2 Sheets-Sheet 2

INVENTOR
Michel Moret
BY
ATTORNEYS

United States Patent Office 3,113,226
Patented Dec. 3, 1963

3,113,226
OSCILLATING DRIVE HAND MOTOR
Michel Moret, Chene Bougeries, Geneva, Switzerland, assignor to Etablissement AESUP, Vaduz, Liechtenstein, a firm
Filed Nov. 28, 1961, Ser. No. 155,365
7 Claims. (Cl. 310—38)

This invention relates to electrically-operated hand appliances for corporal care, and particularly to electrically-operated toothbrushes. The invention is particularly directed to the provision of an electrically safe appliance of this character.

Electrically-operated toothbrushes are now known including a casing forming a handle, a shaft extending through one end of the casing for carrying a toothbrush head, and electrical means mounted within the casing for oscillating the shaft. One particular type is disclosed in U.S. Patent 2,917,758, issued December 22, 1959, to Held et al. In this toothbrush the shaft is rotationally oscillated so as to impart a corresponding motion to a toothbrush head attached thereto and brush the teeth in the lengthwise direction thereof. Other types are known in which a longitudinal oscillation is imparted to the shaft.

By using different types of heads, the appliance can be used for other types of corporal care, such as massage, beauty treatment, etc.

When such appliances are arranged to be connected to an external power supply such as the power mains, it is highly important to provide complete protection against the danger of an electric shock. They are commonly employed in the bathroom where the appliance or the hands of the user may be wet, so that even small amounts of electrical leakage could be dangerous. In the case of a toothbrush, water and toothpaste are commonly used on the brush and, when inserted in the mouth, a fairly good electrically conducting path exists for any leakage current from the device.

With an oscillating shaft, it is difficult to achieve watertightness, while at the same time permitting oscillations of sufficient amplitude to be obtained with the limited power available. Further, even though initially obtained, over an extended period of use the watertightness may become impaired.

Commonly devices of this type are provided with electric switches so that they can be turned off without unplugging the cord from the electric outlet. Also, in many instances an electric motor or other electrical driving means is used which involves the making and breaking of an electric circuit during normal operation. In such devices, if watertightness should fail, serious shock could result.

In accordance with the present invention, a motor or other electrical driving means is employed of a type including an actuating coil which, when supplied with alternating current, will produce oscillation of the shaft without requiring the making and breaking of an electrical circuit internally of the device. The motor described in the above U.S. patent is of this type. The actuating coil is fixedly connected to the conductors of an electric cord provided for connecting the appliance to a suitable source of alternating current such as a house electric outlet. Then, the actuating coil and the insulation of the electric cord adjacent thereto are encapsulated in a waterproof insulating material. Preferably additional means are also provided for rendering the portion of the casing containing the electrical driving means substantially watertight, so as to avoid the corrosive effects of water, toothpaste, etc. and also to further assure complete freedom from electrical leakage.

In order to enable the user to stop operation, as for example when applying toothpaste to the brush head and inserting it into his mouth, means are provided which are manually controllable through the casing for substantially stopping oscillation of the shaft with the coil still energized from the power supply. Accordingly operation can be stopped and started under manual control of the user without unplugging from the electric outlet, which in itself would be a source of danger.

By thus providing for an uninterrupted electrical circuit within the instrument and permanent encapsulation of the elements carrying electric current, in combination with means independent of the electrical circuit enabling manual control of operation by the user, a high degree of safety is obtained while at the same time providing for convenience in use.

Various means may be employed for stopping oscillation of the shaft with the coil energized. In the specific embodiments described hereinafter, a movable magnetic shunting member is employed to shunt flux around the structure actuated thereby during normal operation. In copending application Serial No. 156,215, filed December 1, 1961, by Fresard, a mechanical brake operated by pressure on the casing is employed for the purpose.

The invention will be more fully understood from the following description of specific embodiments thereof, taken in conjunction with the drawings, in which.

Figure 1:
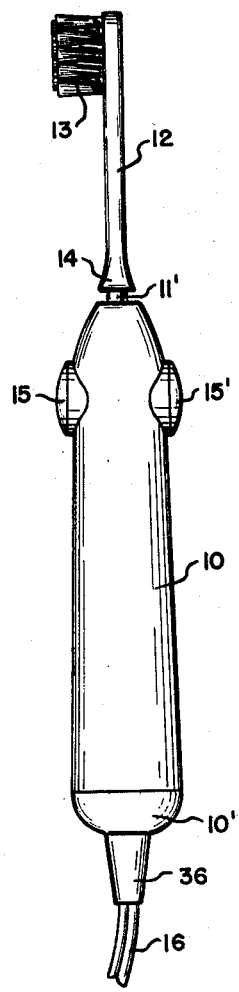
FIG. 1 is an overall view of an electrically-operated toothbrush including handle and attached stem-brush.

Referring to FIG. 1, a casing 10 forms a handle and shaft end 11 projects from the front end thereof. In this embodiment the brush head is detachable from the handle and comprises a stem 12 with bristles 13 mounted thereon, with a coupling at 14 enabling the brush-stem to be conveniently attached and removed. The coupling may be of the type described in application Serial No. 103,482, filed April 17, 1961, by Moret for "Toothbrush Attachment."

The handle is preferably of an insulating material such as a plastic, and resilient buttons 15, 15' are provided to enable actuation of the internal mechanism for stopping the oscillation of shaft 11. Alternating current from an external power supply is supplied through an insulated multiple-conductor electric cord 16 extending through the end cap 10' of the casing in watertight relationship therewith.

Figure 2:
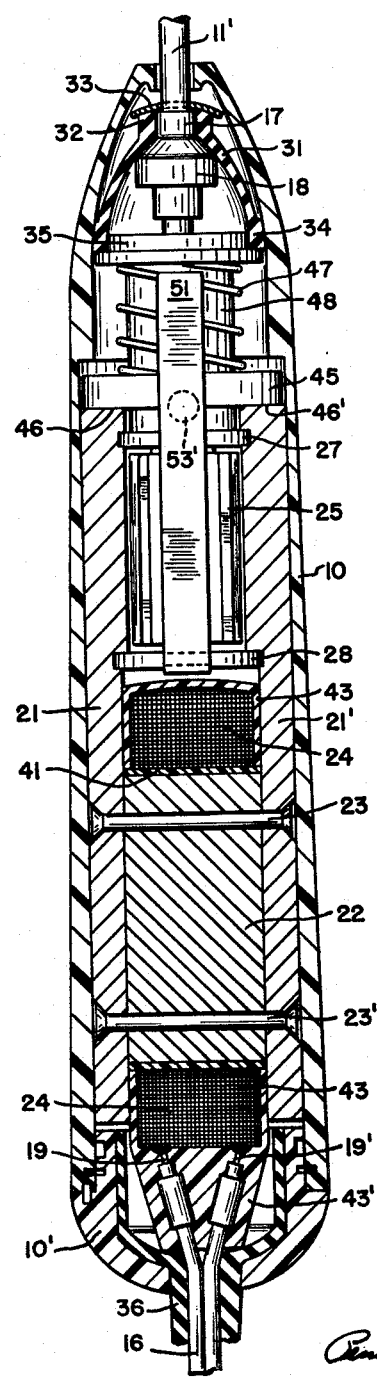
FIG. 2 is a cross-section through the handle showing one magnetic shunting arrangement.
Figure 3:
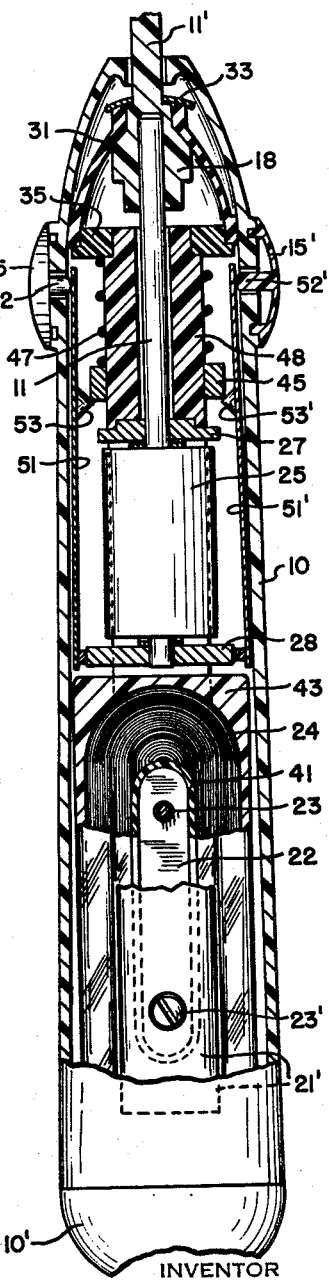
FIG. 3 is a view mostly in cross-section taken at right angles to that of FIG. 2.

Referring to FIGS. 2 and 3, the electrical means for oscillating shaft 11 is here shown as similar to the motor of the aforesaid Patent 2,917,758. The motor has an electromagnetic stator structure including longitudinally extending pole pieces 21, 21' connected at the rear ends thereof by a transverse section 22 of magnetic material, and suitably held together as by rivets 23, 23'. Encircling transverse member 22 is a coil 24. The ends of the coil are fixedly connected to the inner ends 19, 19' of the conductors of the electric cord 16, as by soldering thereto.

A rotor 25 is located between the front ends of pole pieces 21, 21' and is mounted on a shaft 11 rotatably mounted in bearing plates 27 and 28 attached to the pole pieces. The rotor 25 has a permanent magnet forming part thereof which interacts with the alternating magnetic flux between the adjacent portions of pole pieces 21, 21' to produce rotational oscillation. Spring biasing means (not shown) urge the rotor to a given position with respect to the stator, the rotor oscillating about this position in operation.

The type of motor is explained in detail in the aforesaid patent and further explanation here is unnecessary.

To prevent the entry of water, etc. into the portion of the casing containing the motor, a flaring sleeve 31 of flexible, water-impermeable material such as neoprene is provided. The front end 32 thereof encircles an enlarged section 17 of shaft end 11', and the unstretched diameter of the sleeve is made smaller than the diameter of 17 so that the elasticity produces a tight fit and insures water tightness. Section 18 of the shaft end may be somewhat larger so as to provide an abutment for end 32 of the sleeve and a thin washer 33 of a locking type may be placed over shaft end 11' to hold end 32 firmly abutted against section 18. As shown in FIG. 3, shaft end 11' is a molded section fitting over and attached to shaft 11, which may be of steel.

The rear end 34 of the sleeve is held tightly against the inside of the casing by a ring 35.

It is thus seen that sleeve 31 prevents entry of water to the rearward portion of the casing 10 where the motor is located. In operation, the front end 32 of the sleeve twists with respect to the rear end 34, the flexibility of the sleeve allowing this action to take place without impairing the watertight connections with shaft and casing.

The rearward portion of the casing is constructed so as to be watertight. To this end, casing 10 is advantageously made in one piece of an insulating plastic, with the resilient buttons 15, 15' either integral with the casing or firmly adhered thereto. In order to permit assembly, cap 10' is formed separately and then, after assembly, joined watertight to the rest of the casing by an adhesive, or by fusing, etc. A molded plastic insert 36 is employed to insure watertightness where the cord 16 passes through cap 10', and to provide additional strength against breaking the cord in normal use.

Although this construction has been found highly effective in obtaining watertightness, defects in manufacture, wear during use, eventual deterioration of the sleeve 31, etc. could result in impairment of the protection against electric shock. Accordingly, the coil 24 and the insulation of the cord adjacent thereto are encapsulated in a waterproof insulating material, for example a suitable plastic.

Figure 7:
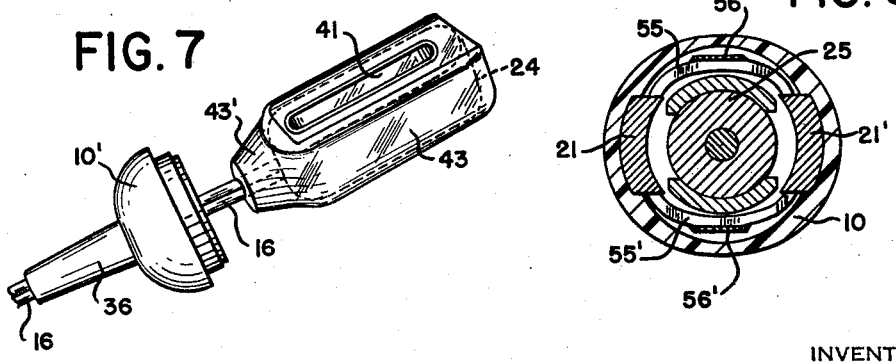
FIG. 7 is a detail showing the encapsulated coil and adjacent portion of the electric cord.

Referring to FIG. 7, coil 24 is formed around an elongated tube 41 of waterproof insulating material. Nylon has been employed with success. The cross-section of the elongated tube is shaped to accommodate the transverse member 22 which forms part of the magnetic circuit. The coil is then embedded in an insulating waterproof plastic 43 which extends over the adjacent ends of the insulation of electric cord 16 at 43' and firmly adheres thereto. The encapsulation has been accomplished, in practice, by molding with an epoxy resin.

In FIG. 7 cap 10' has been moved away from the encapsulated coil and cord for clarity of illustration. However, as shown in FIG. 2, when the toothbrush is assembled the cap is adjacent molded end 43'.

It will therefore be understood that all elements within the casing carrying an electric current are encapsulated in a waterproof insulating material and are fixedly mounted in the handle. Thus, freedom from danger of electric shock is obtained in a highly reliable manner.

Returning to FIGS. 2 and 3, a shunting member 45 of magnetic material such as soft iron is normally pressed against the ends 46, 46' of pole pieces 21, 21' by a spring 47. This provides a magnetic shunt which shunts flux around rotor 25 so as to substantially stop actuation thereof. Member 45 is slidable along tube 48 which is secured to bearing 27 and ring 35. Tube 48 may be of plastic.

Spring members 51 and 51' are secured at their rear ends to bearing plate 28 and extend under the center portions 52, 52' of resilient buttons 15, 15'. The springs are provided with small wedges 53, 53' having slanting surfaces engaging the shunting member 45. When the buttons 15, 15' are manually depressed by pressure thereon, wedges 53, 53' move member 45 away from ends 46, 46' of the pole pieces, thereby removing the magnetic shunt and allowing oscillation to take place.

In this embodiment the member 45 is in its shunting position in the absense of pressure on buttons 15, 15'. Thus, oscillation takes place only upon manual pressure on the buttons. If desired, the member 45 could be spring-biased to its non-shunting position to allow oscillation in the absence of pressure on the buttons, and the wedges 53, 53' positioned to press the shunting member against the pole pieces when the buttons are depressed.

Figure 4:
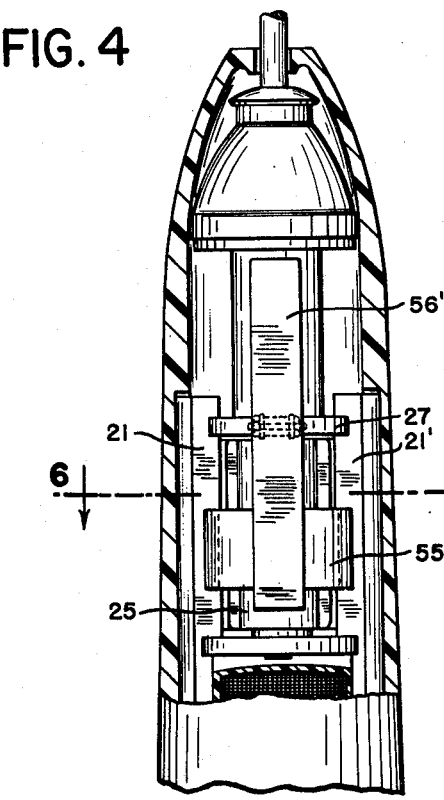
FIGS. 4 and 5 are cross-sections of a portion of the handle, taken at right angles to each other, showing a different magnetic shunting arrangement.
Figure 5:
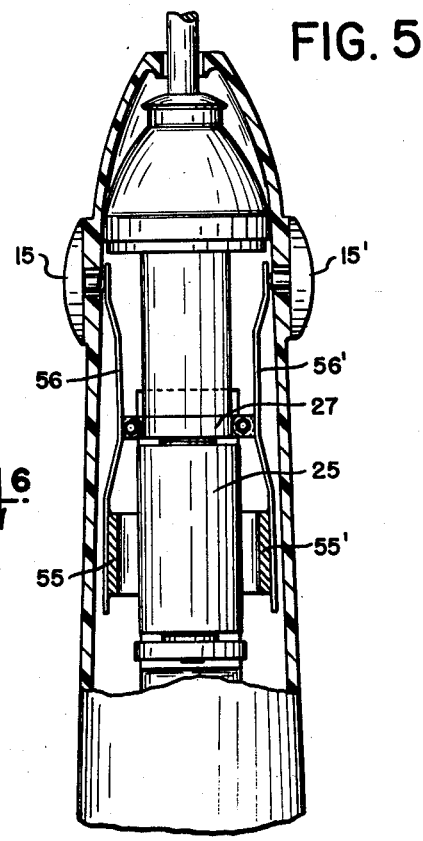
Figure 6:
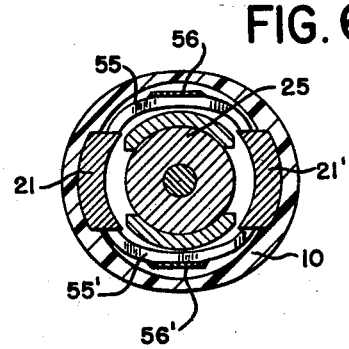
FIG. 6 is a cross-section taken along the line 6—6 of FIG. 4.

Referring now to FIGS. 4 and 5, an alternative arrangement for producing magnetic shunting is shown. Here a pair of shunting members 55, 55' are mounted on levers 56, 56' pivoted to the front bearing member 27 with the front ends extending under buttons 15, 15'. The shunting members 55, 55' are of arcuate shape, as shown in FIG. 6, and arranged to bridge the pole pieces 21, 21' and form magnetic shunting paths when in contact therewith. By pressing buttons 15, 15', the shunting members are moved away from the pole pieces, thus removing the magnetic shunts and allowing oscillation to take place.

In using the appliance it is not expected that the cord will be permanently plugged into an electric outlet, since this would be a continuous power drain and would overheat the motor. Rather, it is expected that the cord will be plugged in only when it is desired to use the appliance. Then manual control of the push buttons permits stopping and starting the operation as desired.

Although the specific embodiments show the use of magnetic shunting, within the broader aspects of the invention other means may be provided for substantially stopping operation with the coil remaining energized. Also, other specific driving means may be employed instead of the motor shown, of a type not requiring the making and breaking of the electric circuit during operation.

I claim:

1. An electrically-operated hand appliance for corporal care which comprises
   (a) a casing forming a handle,
   (b) a shaft extending through one end of the casing for carrying an appliance head,
   (c) electrical means mounted within the casing for oscillating the shaft,
   (d) said electrical means including an actuating coil for connection to an external alternating-current power supply to produce oscillation of the shaft,
   (e) an insulated multiple-conductor electric cord extending through said casing and having the conductors thereof fixedly connected to the ends of said coil,
   (f) said coil and the insulation of the cord adjacent thereto being encapsulated in a waterproof insulating material,
   (g) and means manually controllable through said casing for substantially stopping oscillation of the shaft with said coil energized from the power supply through said cord.

2. An electrically-operated hand appliance for corporal care which comprises
   (a) a casing of insulating material forming a handle,
   (b) a shaft extending through one end of the casing for carrying an appliance head,
   (c) electrical means mounted within the casing for oscillating the shaft,
   (d) said electrical means including an actuating coil for connection to an external alternating-current power supply to produce oscillation of the shaft,
(e) means for rendering substantially watertight the portion of the casing containing the electrical means,
(f) a multiple-conductor electric cord extending through the wall of said portion of the casing in substantially watertight relationship and having the conductors thereof fixedly connected to the ends of said coil,
(g) said cord being insulated with a waterproof material and the coil and the insulation of the cord adjacent thereto being embedded in a waterproof insulating material,
(h) and means manually controllable through said casing for substantially stopping oscillation of the shaft with said coil energized from the power supply through said cord.

3. An electrically-operated toothbrush which comprises
(a) a casing of insulating material forming a handle,
(b) a shaft extending through one end of the casing for carrying a toothbrush head,
(c) electrical means mounted within the casing for oscillating the shaft,
(d) said electrical means including an actuating coil for connection to an external alternating-current power supply to produce oscillation of the shaft,
(e) means for rendering substantially watertight the portion of the casing containing the electrical means,
(f) an insulated multiple-conductor electric cord extending through said casing and having the conductors thereof fixedly connected to the ends of said coil,
(g) said coil and the insulation of the cord adjacent thereto being encapsulated in a waterproof insulating material,
(h) and means within said casing controllable by manual pressure on the casing for substantially stopping oscillation of the shaft with said coil energized from the power supply through said cord.

4. An electrically-operated toothbrush which comprises
(a) a casing of insulating material forming a handle,
(b) a shaft extending through one end of the casing for carrying a toothbrush head,
(c) an electric motor mounted within the casing for rotationally oscillating the shaft,
(d) said motor having an electromagnetic stator structure including an actuating coil and being adapted to produce rotational oscillation of the shaft when alternating current is supplied to the coil,
(e) means for rendering the portion of the casing containing the motor substantially watertight,
(f) a multiple-conductor electric cord extending through the wall of said portion of the casing in substantially watertight relationship and having the conductors thereof fixedly connected to the ends of said coil for supplying alternating-current to the coil from a power supply,
(g) said cord being insulated with a waterproof material and the coil and the insulation of the cord adjacent thereto being encapsulated in a waterproof insulating material,
(h) and means within said watertight portion of the casing controllable by manual pressure on the casing for substantially stopping oscillation of the shaft with said coil energized from the power supply through said cord.

5. Apparatus in accordance with claim 4 in which the coil and the insulation of the cord adjacent thereto are embedded in a waterproof insulating plastic.

6. An electrically-operated hand appliance for corporal care which comprises (a) a casing forming a handle,
(b) a shaft extending through one end of the casing for carrying an appliance head,
(c) an electric motor mounted within the casing including an electromagnetic stator structure and a rotor for rotationally oscillating the shaft,
(d) the stator structure including pole pieces extending adjacent the rotor and an actuating coil for supplying alternating magnetic flux to the rotor to produce oscillation thereof when alternating current is supplied to the coil,
(e) an insulated multiple-conductor electric cord extending through the casing and having the conductors thereof fixedly connected to the ends of said coil for supplying alternating current to the coil from a power supply,
(f) said coil and the insulation of the cord adjacent thereto being encapsulated in a waterproof insulating material,
(g) movable means of magnetic material mounted within the casing for establishing a magnetic circuit between said pole pieces shunting flux around the rotor to substantially stop oscillation thereof with said coil energized from the power supply through said cord,
(h) and means manually actuable through the casing for moving said movable means between shunting and non-shunting positions.

7. An electrically-operated toothbrush which comprises
(a) a casing of insulating material forming a handle,
(b) a shaft extending through one end of the casing for carrying a toothbrush head,
(c) an electric motor mounted within the casing including an electromagnetic stator structure and a rotor for rotationally oscillating the shaft,
(d) the stator structure including pole pieces extending adjacent the rotor and an actuating coil for supplying alternating magnetic flux to the rotor to produce oscillation thereof when alternating current is supplied to the coil,
(e) means for rendering the portion of the casing containing the motor substantially watertight,
(f) a multiple-conductor electric cord extending through the wall of said portion of the casing in substantially watertight relationship and having the conductors thereof fixedly connected to the ends of said coil for supplying alternating-current to the coil from a power supply,
(g) said cord being insulated with a waterproof material and the coil and the insulation of the cord adjacent thereto being encapsulated in a waterproof insulating material,
(h) movable means of magnetic material mounted within the watertight portion of the casing for establishing a magnetic circuit between said pole pieces shunting flux around the rotor to substantially stop oscillation thereof with said coil energized from the power supply through said cord,
(i) and means actuable by manual pressure on the outside of the casing for moving said movable means between shunting and non-shunting positions.

References Cited in the file of this patent
UNITED STATES PATENTS
1,739,885    Zbinden ---------------- Dec. 17, 1929